3,310,417
SILICON-CONTAINING WATER REPELLENT COMPOSITIONS

Robert W. Lerner and Amos R. Anderson, Adrian, and Charles G. Neuroth, Blissfield, Mich., assignors to Stauffer Chemical Company
No Drawing. Filed Oct. 22, 1964, Ser. No. 405,820
9 Claims. (Cl. 106—287)

This invention is concerned with certain novel silicon-containing compositions. In particular, it is concerned with certain compositions formed by reaction among an alkyltrimethoxysilane, a tetraalkylorthosilicate and water. The products of this reaction are water-soluble and possess the very desirable property of drying from water solutions to form a water-insoluble film which actually repels water.

This application is a continuation-in-part of our application Ser. No. 178,573, filed Mar. 9, 1962 and now abandoned.

It has now been discovered that an alkyltrimethoxysilane can be used to make a tetraalkylorthosilicate water-soluble by reacting with it and with the water. For the purposes of the present invention, the ratio of alkyltrimethoxysilane to tetraalkylorthosilicate should vary from about 1 to 3 to about 3 to 1. The alkyl group of the alkyltrimethoxysilane may contain up to 6 carbon atoms, while the alkyl groups of the tetraalkylorthosilicate may be methyl or ethyl, and they may be the same or different.

The starting materials for the compositions of the present invention, i.e., the alkyltrimethoxysilane and the tetraalkylorthosilicates are materials known in the art, and they may be prepared by methods previously described in the literature.

One method of preparing the compositions of the present invention is first to react an alkyltrimethoxysilane with water. The reaction is spontaneous and exothermic and is accompanied by the evolution of gas. The product of this reaction is then reacted with a tetraalkylorthosilicate. This second reaction is also exothermic and occurs spontaneously with the evolution of gas. The product of this second reaction is soluble in water, but a water solution of the product dries to a tough, water-repellent film, which may be used to coat porous materials and make them water-repellent. The film resists wear and adheres tightly to any porous material, for example, paper, wood or concrete. The film does not adhere to non-porous materials such as metals.

The composition of the present invention may be applied as a coating in any of the conventional ways, such as brushing it on like paint, or spraying it with compressed gas. The composition of the present invention is also a fiber-former, which may be drawn out into fiberglas-like threads.

The most convenient form for utilizing the present invention in the coating of materials to make them water-repellent is first to prepare a mixture of, for example, from 1 to 3 parts of methyltrimethoxysilane and from 3 to 1 parts of tetraethylorthosilicate. This mixture is then mixed with approximately an equal volume of water, or a very dilute solution of acid in water. It should be emphasized that prior to mixing with water, the mixture of alkyltrimethoxysilane and tetraalkylorthosilicate is perfectly stable upon storage. It is only upon mixing with water that reaction takes place to yield a water soluble product. It is an object of the present invention to provide a novel mixture of from 1 to 3 parts of alkyltrimethoxysilane and from 3 to 1 parts of tetraalykylorthosilicate which may be stored as such and then simply be diluted with water prior to use as a coating material.

In the treating of a porous product such as concrete to make it water-repellent, the aqueous solution of the present invention is conveniently applied at a concentration of about 5 percent of the solid, i.e. silicon-containing, materials in water. This concentration may readily be varied over a wide range, from about 1% to about 50%, and it is one of the advantages of the present invention that such variation is possible. However, a solution containing as high as 70% solids (i.e., 30% water) can be prepared, as shown in Examples I to III below, and can be used as such for treating surfaces to render them water-repellent. In other words, water can be added in an amount ranging from about 0.4 to about 100 times the combined volume of the silane and silicate.

It should be emphasized that unlike previously known silicon-containing paints, the present invention does not require any special mixing equipment or any difficult mixing technique. Furthermore, the equipment used for mixing may be easily cleaned by simple rinsing with water. After being diluted with water, the mixture is not flammable and has the additional advantages of being practically neutral and of being non-toxic. In summary, the present invention provides a relatively inexpensive and easily prepared water-based paint which makes a porous substrate water-repellent after drying.

The exact nature of the chemical reaction taking place among the alkyltrimethoxysilane, the tetraalkylorthosilicate and the water is not known with certainty, and it is not intended to limit the present invention to any particular mode of reaction. It may, however, be postulated that what takes place is intermolecular condensation polymerization caused by the elimination of molecules of water and/or alcohol between the silicon-containing moieties. It is known, for example, that the water solution formed by the reaction dries to a hard, water-repellent film even when the drying takes place under an atmosphere of nitrogen. This fact tends to rule out the possibility that the reaction involves free radicals formed under the influence of the oxygen in the air. The same composition results whether the drying takes place in air or under nitrogen.

The reactions of water with the alkyltrimethoxysilane and/or the tetraalkylorthosilicate apparently produces alcohols and silanol groups. The silanol groups condense with each other to form Si—O—Si linkages and water. The silanol groups also condense with alkoxy groups in the alkyltrimethoxysilane and/or the tetraalkylorthosilicate to form alcohols and Si—O—Si linkages.

It has been found that the presence of an alcohol facilitates hydrolysis of the silane and renders the silane and silicate mutually miscible thereby facilitating all the hydrolysis and condensation reactions which take place in the system of this invention. The benefit derived from the presence of inherent alcohol in the system can be substantially increased by adding as an additional ingredient an alcohol containing no more than two carbon atoms, i.e. methanol and/or ethanol. The alcohol ingredient can be added in an amount up to twice (200%) the combined volume of the silane and silicate components, preferably from 50% to 150% by volume based on the combined volume of the silane and silicate. The best commercial formulation presently known contains methanol in an amount equal (100%) to the combined volume of silane and silicate, but this could range from 80% to 120% of that combined volume and could be ethanol instead of methanol.

It has also been found that when the aqueous system is acidic, e.g. a pH of about 2 to 6, preferably 2 to 3, it is substantially more stable than a neutral or basic system. One method of making the system acid is the use of dilute solutions of mineral acids such as HCl or sulfuric acid in place of water as set forth above. Alternatively, an organic acid, such as diethylhydrogenphosphite or ethyldihydrogenphosphite, can be employed. Such a compound can be mixed with the silane and silicate even in an alcohol solution without affecting the pH of the system, but the addition of water hydrolyzes the phosphite and turns the system acidic. An organic acid should not be present in an amount greater than about 10 percent by volume and is preferably employed in an amount ranging from about 1 to about 3 percent. While an ultimate pH of about 3 appears to be the most desirable, a pH up to about 6 shows improvement in solution stability over neutral or basic solutions.

Where a cellulosic surface as in paper or cloth fabric is to be treated with a composition of this invention, it is desirable to render the system basic immediately prior to use by the addition of a weak base such as an amine, e.g. triethylene diamine, triethyl amine or triethanol amine. The pH of the system can be raised to as high as about 10 for this use.

The following examples are given solely for the purpose of illustration and are not to be construed as limitations on the present invention, many variations of which will occur to those skilled in the art without departing from the spirit or scope thereof.

*Example I*

Methyltrimethoxysilane (10 ml.) was admixed with water (10 ml.) and stirred for 10 minutes during which time an exothermic reaction ensued resulting in a clear solution. Tetraethylorthosilicate (10 ml.) was added to this solution. The resulting mixture was stirred for 5 minutes, resulting in an exothermic reaction producing another clear solution. This second solution was further diluted with water (370 ml.). This dilute solution was then brushed onto a concrete sidewalk section. After air drying, the concrete possessed a wear resistant and water-repellent coating.

*Example II*

In a similar manner, propyltrimethoxysilane (10 ml.) was admixed with water (10 ml.) and the above experiment repeated. The concrete coated in the above manner possessed similar properties.

*Example III*

In a similar manner butyltrimethoxysilane (10 ml.) was admixed with water (10 ml.) and the above-mentioned experiment repeated, with similar results.

*Example IV*

In like manner, other alkyltrimethoxysilanes may be employed in the manner of the above examples with other tetraalkylorthosilicates. Good results are obtained when the alkyl group of the alkyltrimethoxysilanes contains up to 6 carbon atoms, and when the alkyl groups of the tetraalkylorthosilicates are selected from the group consisting of methyl and ethyl. It should be noted that concrete treated with the compositions of the present invention shows increasing water repellency with increase in the size of the alkyl group of the alkyltrimethoxysilane. On the other hand, the ease with which the alkyltrialkoxysilane reacts with water decreases with increase in the size of the alkyl group.

*Example V*

10 ml. of methyltrimethoxysilane was mixed with 10 ml. of tetraethylorthosilicate. No reaction took place, and the mixture was unchanged after storage for one week in a closed container. The mixture was then mixed with 20 ml. of acidic water (0.005 N HCl) and an exothermic reaction took place spontaneously. After 10 minutes, the reaction product was diluted with 350 ml. of water. This dilute solution was then applied to paper, wood, bricks and concrete. The treated materials were water-repellent and "weather-proof."

*Example VI*

When 10 ml. of methyltrimethoxysilane, 10 ml. of tetraethylorthosilicate, 20 ml. of methanol and 0.3 ml. of ethyldihydrogenphosphite are mixed, no reaction takes place and the mixture is essentially neutral. When 20 ml. of water are added to the mixture, an exothermic reaction takes place spontaneously producing an acidic aqueous solution of the reaction product. When this solution is diluted with 350 ml. of water and applied to bricks, the treated bricks, after drying, are water-repellent.

Having thus described our invention, we claim:

1. A composition of matter consisting essentially of the product of the reaction of (a) from 1 to 3 parts of an alkyltrimethoxysilane having up to 6 carbon atoms in the alkyl group, (b) from 3 to 1 parts of a tetraalkylorthosilicate having up to 2 carbon atoms in each alkyl group. and (c) water in an amount ranging from about 0.4 to about 100 times the combined volume of (a) and (b).

2. A composition of matter consisting essentially of the product of the reaction of (a) from 1 to 3 parts of methyltrimethoxysilane, (b) from 3 to 1 parts of tetraethylorthosilicate, and (c) water in an amount ranging from about 0.4 to about 100 times the combined volume of (a) and (b).

3. A composition of matter comprising a storage-stable mixture of from 1 to 3 parts of an alkyltrimethoxysilane having up to 6 carbon atoms in the alkyl group, with from 3 to 1 parts of a tetraalkylorthosilicate having up to 2 carbon atoms in each alkyl group.

4. A composition of matter comprising a storage-stable mixture of from 1 to 3 parts of methyltrimethoxysilane with from 3 to 1 parts of tetraethylorthosilicate.

5. A composition in accordance with claim 1 containing (d) an alcohol containing up to two carbon atoms as an additional component to the reaction mixture in an amount up to twice the combined volume of (a) and (b).

6. A composition in accordance with claim 3 containing an alcohol containing up to two carbon atoms in an amount up to twice the combined volume of alkyltrimethoxysilane and tetraalkylorthosilicate.

7. A composition in accordance with claim 1 wherein the reaction product is acidified to a pH of from 2 to 6.

8. A composition in accordance with claim 5 wherein the reaction product is acidified to a pH of from 2 to 6.

9. A composition in accordance with claim 6 containing up to 10 percent by volume based on the combined volumes of (a) and (b) of an organic acid phosphite.

References Cited by the Examiner

Rochow, "Chemistry of the Silicones," Second edition, 1951, pp. 70–73 relied on.

MORRIS LIEBMAN, *Primary Examiner.*
ALLAN LIEBERMAN, *Examiner.*